United States Patent [19]

Murakami

[11] Patent Number: 4,709,874

[45] Date of Patent: Dec. 1, 1987

[54] CLUTCH MECHANISM FOR A FISHING REEL

[75] Inventor: Hideo Murakami, Hiroshima, Japan

[73] Assignee: Ryobi, Ltd., Fuchu, Japan

[21] Appl. No.: 829,501

[22] Filed: Feb. 14, 1986

[30] Foreign Application Priority Data

Feb. 15, 1985 [JP] Japan .................................. 60-21051

[51] Int. Cl.[4] ............................................ A01K 89/02
[52] U.S. Cl. .................................. 242/220; 192/93 R
[58] Field of Search ............... 242/218, 219, 220, 221; 192/67 R, 93 R, 93 C

[56] References Cited

U.S. PATENT DOCUMENTS

| | | | |
|---|---|---|---|
| 1,939,148 | 12/1933 | Spenny | 242/220 |
| 4,341,366 | 7/1982 | Kawada | 242/220 |
| 4,369,936 | 1/1983 | Noda | 242/220 |
| 4,379,530 | 4/1983 | Kobayashi | 242/220 |

Primary Examiner—Billy S. Taylor
Attorney, Agent, or Firm—Finnegan, Henderson, Farabow, Garrett, and Dunner

[57] ABSTRACT

A clutch mechanism for a fishing reel wherein the shaft supporting the spool is selectively engaged and disengaged from the drive mechanism through a clutch. The clutch also actuates a spring bias link having an opening therein that includes a stepped and elongated portion. A kick pawl pivotally affixed to the link is disposed to lie between the teeth of a ratchet which is driven by the handle of the fishing reel. Upon turning the handle, the kick pawl moves the link such that the projection moves into the elongated portion of the opening in the link, thereby allowing a spring that biases the clutch to engage the pinion gear with the spool shaft.

5 Claims, 6 Drawing Figures

CLUTCH MECHANISM FOR A FISHING REEL

BACKGROUND OF THE INVENTION

1. Field of the Invention

The present invention relates to means for engaging and disengaging the spool from the handle-actuated drive mechanism of a fishing reel and to means for automatically re-engaging the spool when the handle is turned.

2. Discussion of the Prior Art

To provide the function set out above, there is conventionally provided a reel having a pinion gear in engagement with a master gear that is rotated by the handle. The pinion is axially slideable on the spool shaft and engages a coupling portion thereon. A clutch bar engages the pinion and is moved by a clutch cam that is disposed between the body of the reel and the clutch bar. The clutch cam is connected to an operating lever where operation of the lever disengages and engages the pinion on the spool shaft while a rachet is rotated.

In such a conventional device, when the clutch is disengaged and the handle is not being rotated, the tip of a pawl is urged into engagement with the ratchet such that the tip of the pawl lies between the teeth of the ratchet. If the tip of the pawl engages the tip of the ratchet teeth, then the operation of the clutch is impared.

Further, since this faulty engagement of the pawl with the ratchet occurs in direct proportion to the number of teeth on the ratchet, it is conventional to reduce the number of teeth on the ratchet. This results in the revolution angle of the handle to change the reel from a disengaged state to an engaged condition, being excessive as well as increasing the force required to re-engage the spool and handle by turning the handle. These characteristics impair the ability of the user to rapidly and controllably make the changeover and further impairs the ability of the user to rapidly cope with changes in conditions when fighting a fish.

U.S. Pat. No. 4,406,427 to Murakami discloses one means of preventing faulty engagement of the pawl and the ratchet by off-setting the center of pivot of a kick pawl that engages the ratchet with the center of rotation of the ratchet. While solving the problem with faulty engagement of the pawl with the ratchet, the disclosed devices include some shortcomings in operation due to the manner in which the linkage operating the clutch and the pawl are spring biased.

Therefore, it is an important object of the present invention to provide a reel mechanism that eliminates the need for a ratchet having a reduced number of teeth and thereby eliminate impaired operation of the clutch due to faulty pawl engagement. It is a further object of the invention to improve the operation of the clutch mechanism by improving the manner in which the mechanism is spring biased. It is an additional object of the invention to reduce the number of parts in such a mechanism to facilitate miniaturization and economic manufacture of such a device.

SUMMARY OF THE INVENTION

In order to accomplish these and other objects of the invention, there is provided a clutch mechanism for a fishing reel. The fishing reel includes a frame means for supporting components of the reel in an operative arrangment, a spool for storing and dispensing fishing line therefrom, means for driving the spool, a spool shaft connected to the spool, and a pinion gear. Also included is means for selectively engaging the pinion gear with the spool shaft, the engaging means having an actuating lever and cam means connected to the actuating lever. The cam means rotates with respect to the pinion gear to engage and disengage the pinion gear with the spool shaft. First spring means urges the cam means into a position where the pinion gear is engaged with the spool shaft. An elongated intermediate link is pivotably connected at one extremity to the cam means and has an opening therein, the opening including a stepped portion and an elongated portion. A projection from the frame means is located within the opening and is disposed to limit movement of the link when the link engages the projection with the stepped portion of the link opening. Second spring means is disposed to bias the link into engagement with the projection in the stepped portion of the link opening. A kick pawl is pivotally affixed to the link at the end of the link opposite the pivotal connection of the link to the cam means. The kick pawl has at the end opposite the pivotal connection a tip portion. The reel further includes a circular ratchet member having a plurality of teeth on its outer peripheral edge. The ratchet member is connected to the drive means and the tip portion of the kick pawl is disposed to lie between the teeth when the clutch is disengaged. Third spring means is disposed between the kick pawl and the link to bias the kick pawl toward the ratchet. Means on the link limit the extent of movement of the tip portion toward the ratchet.

Preferably, rotation of the ratchet in one direction engages the ratchet teeth with the tip portion of the kick pawl to move the link against the bias of the second spring for changing the engagement with the projection from the stepped portion of the link opening to the elongated portion of the opening, whereupon the cam means is rotated by means of the first spring to engage the pinion gear and the spool shaft. It is further preferred that the first spring means apply a unidirectional force to the actuating lever. It is further preferred that when there is engagement of the tip portion of the kick pawl with the outer radial extremity of the teeth on the ratchet, the kick pawl pivots with respect to the intermediate link and the intermediate link moves to disengage the pinion from the spool shaft.

DESCRIPTION OF THE DRAWINGS

The accompanying drawings, which constitute a part of this specification illustrate one embodiment of the invention and, together with the description, serve to explain the principles of the invention.

Of the drawings.

DESCRIPTION OF THE PREFERRED EMBODIMENT

Figure 1:
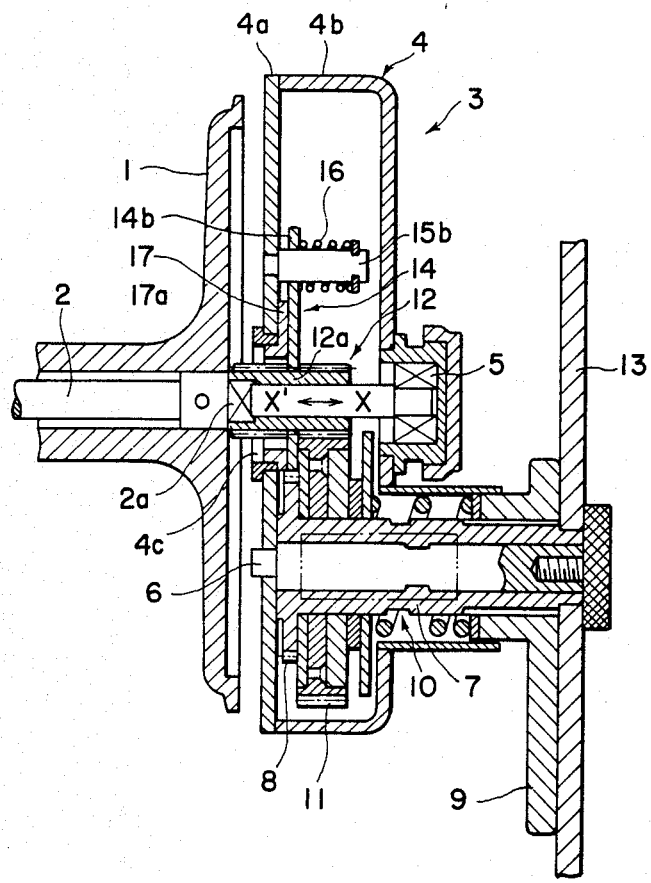
FIG. 1 is a longitudinal side view in cross section showing an embodiment of the clutch mechanism for a double-bearing reel according to the present invention.

An embodiment according to the present invention will be described in detail with reference to the accompanying drawings. First, a rotational force transmission between a handle and a spool shaft is provided as shown in FIG. 1 by having a spool shaft 2 with a spool 1 fixedly mounted thereon rotatably supported by opposite side-frame portions 4 of a reel body 3 by means of bearing 5. A pinion 12 mounted on the spool shaft 2 is meshed with a master gear 11 disposed between a ratchet 8 and a drag star handle 9 through a drag mechanism 10. The ratchet is mounted on a ratchet shaft 7 supported on a side plate 4a of one of the side frame portions 4 by a supporting shaft 6 with the drag star handle 9 being threaded on the ratchet shaft 7.

The pinion 12 is mounted on the spool shaft 2 axially slideably in the direction as shown by arrows X←→X' in FIG. 1 so that the transmission of a rotational force applied through a handle 13 to the spool shaft 2 is engaged or disengaged when the pinion 12 is respectively coupled with or released from a coupling portion 2a formed on the spool shaft 2.

Figure 3:
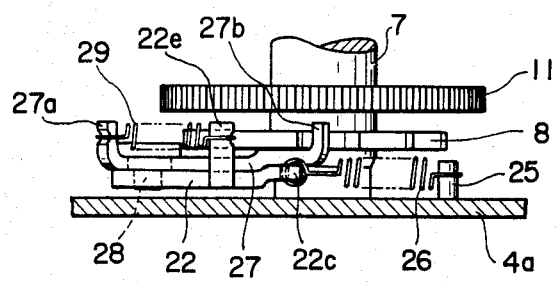
FIG. 3 is a cross-sectional transverse side view along line III—III of FIG. 2.

In such a double bearing reel provided with the foregoing rotational force transmission mechanism, the clutch mechanism according to the present invention is arranged in such a manner as follows:

As shown in FIGS. 1 and 3, a clutch bar 14, fitted in an annular recess portion 12a formed at an outer periphery of the pinion 12, is arranged to be movable in the axial direction of the spool shaft 2. Opposite arms 14a and 14b of the clutch bar 14 respectively are fittingly inserted on the two pins 15a and 15b fixed on an inner surface of the side plate 4a at symmetrical positions with respect to the pinion 12. The clutch bar is elastically urged toward the side plate 4a by spring 16 and a similar spring (not shown) inserted on the respective pins 15b and 15a. A clutch cam 17 is rotatably disposed between the clutch bar 14 and the side plate 4a such that a cylindrical portion 17a formed at the central portion of the clutch cam 17 is fittingly inserted between the pinion 12 and a through hole 4c of the side plate 4a.

Figure 2:
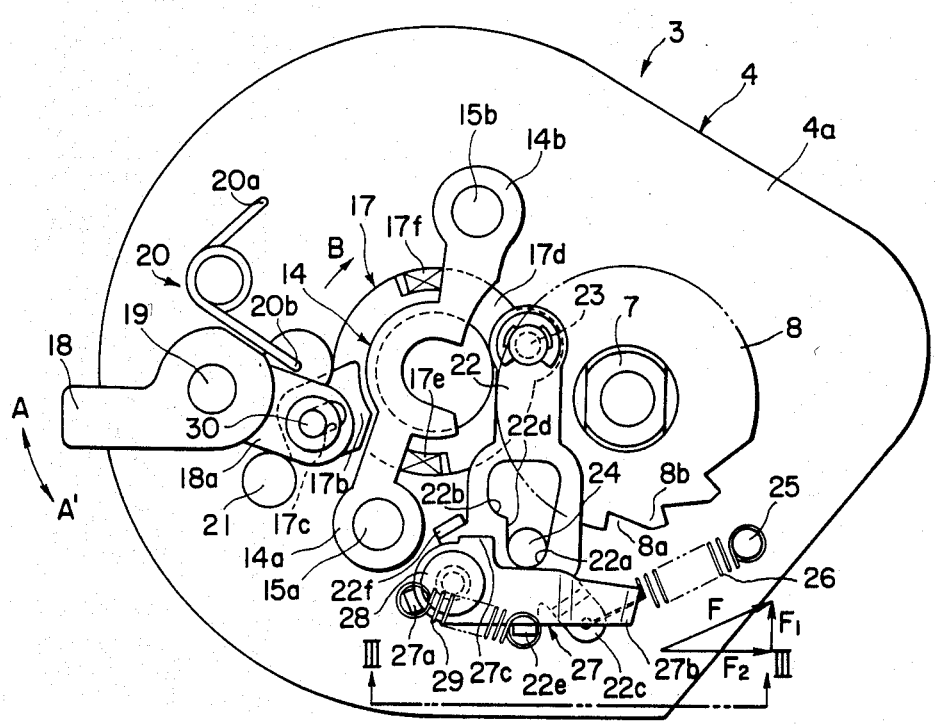
FIG. 2 is a front view showing the embodiment of FIG. 1 with the clutch engaged.

Further, a lever 18 disposed on the side of the clutch cam 17 is pivotally supported by a lever shaft 19 fixed on the inner surface of the side plate 4a so as to be rotatably in the direction of arrows A←→A' of FIG. 2. A unidirectional returning force in the direction of an arrow A of FIG. 2 is applied to the lever 18 by a lever spring 20 with its one end 20a and the other end 20b hung on the side plate 4a and the lever 18 respectively. The lever 18 is normally held in a position as shown in FIG. 2 against the spring force of the lever spring 20 because the protrusion 18a projecting from a pivot portion of the lever 18 abuts on a stopper 21 projected from the side plate 4a. The lever 18 projects out of an opening (not shown) in the side frame portion 4 which is formed by fixing a cover plate 4b on the outside of side plate 4a so that the lever 18 can be operated externally.

A pin 30 fixed on the protrusion 18a of the lever 18 engages an elongated hole 17c of protrusion 17b sidewardly projected from the clutch cam 17 so that the lever 18 and the clutch cam 17 are linked with each other to thereby apply the spring force of the lever spring 20 to the clutch cam 17 as a returning force in the direction opposite to an arrow B of FIG. 2.

Figure 4:
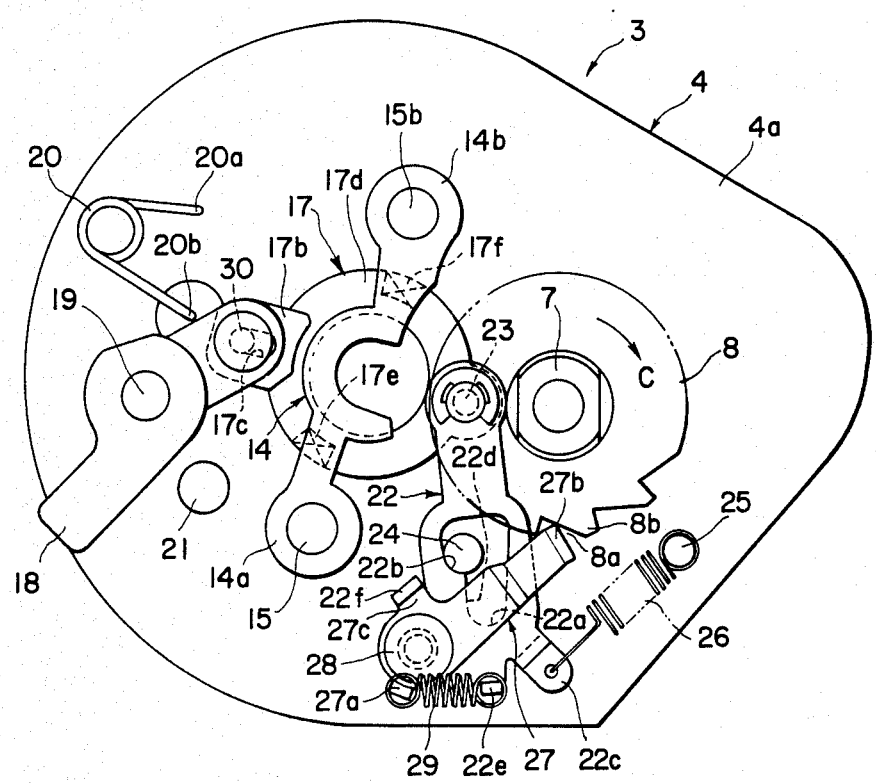
FIG. 4 is a front view showing the embodiment of FIGS. 1-3 with the clutch disengaged.

As shown in FIGS. 2 and 4, cam portions 17e and 17f corresponding to the arms 14a and 14b of the clutch bar 14 projected axially at an angle from a disc portion 17d of the clutch cam 17, each of cam portions 17e and 17f having an amount S of displacement substantially larger than the coupling length of the pinion 12 with the coupling portion 2a of the spool shaft 2. The respective cam portions 17e and 17f come under the arms 14a and 14b when the clutch cam 17 is rotated in the direction of the arrow B of FIG. 2 to cause the clutch bar 14 to move rightward in FIG. 1 against the spring force, so that the pinion 12 is moved in the direction of the arrow X of FIG. 1 so as to be released from the coupling portion 2a of the spool shaft 2.

Further, an elongated link 22 is pivotally supported at its upper end portion by a shaft 23 fixed on the disc portion 17d of the clutch cam 17, between the clutch cam 17 and the ratchet 8. The link 22 is longitudinally shaped and at its substantially central portion is provided with a longitudinally elongated opening 22a. A stepped portion 22b is integrally formed at an upper side (the left side in the drawing) of the opening 22a. A guide shaft 24 projects from the side plate 4a and fits within the opening 22a so that the link 22 is vertically movable, while the guide shaft 24 is provided such that when it is engaged with the stepped portion 22b the vertical movement of the link 22 is limited.

A link spring 26 is stretched by hooking its opposite end portions to a spring hanger 22c provided on the lower one side of the link 22 and a spring hanger 25 on the side plate 4a respectively. Link spring 26 is stretched so that the link 22 is pulled rightward (toward the ratchet 8) in FIG. 2 by a spring force F so as to produce a force $F_2$ for urging edge 22d of the stepped portion 22b of the opening 22a against the guide shaft 24, as well as a force $F_1$ for urging the link 22 to slide upward with the relationship $F_1 < F_2$.

Further, a kick pawl 27 is supported at its base end portion rotatably at a predetermined angle by a kick pawl shaft 28 fixed on the left side at the lower end portion of the link 22. The kick pawl 27 is transversely supported and a rotational force is applied to the kick pawl 27 in one direction where the tip 27b of the kick pawl 27 is meshed with the ratchet 8. That is, a counterclockwise force is provided to kick pawl 27 by a kick pawl spring 29 stretched with its opposite ends hung by a spring hanger 27a formed on the kick pawl 27 and a spring hanger 22e provided on the link 22 respectively.

Moreover, a stop 22f projects from the link 22 so that a protrusion 27c formed on the kick pawl 27 on one side of its base (the upper portion of the drawing) abuts stop 22f to limit the rotation of the kick pawl 27 toward the ratchet 8.

The lever spring 20 provided to rotationally return the lever 18 and the clutch cam 17, the lever spring 20 being affixed at its one end 20a to a predetermined portion of the side plate 4a so that the lever 18 does not exceed a dead point even when it is rotated in the direction of the arrow A' by an angle required for rotating the clutch cam 17 in the direction of the arrow B of FIG. 2. That is, the lever spring 20 is provided so that the lever 18 and the clutch cam 17 are always elastically urged in the direction of the arrow A and in the direction opposite to the arrow B respectively.

FIGS. 1 and 2 show the clutch in the engaged state in the foregoing embodiment. When the lever 18 is rotated in the direction of the arrow A' against the spring force of the lever spring 20 in this engaged state, the clutch cam 17 linked with the lever 18 is rotated in the direction of the arrow B, so that the cam portions 17e and 17f come under the arms 14a and 14b of the clutch bar 14 respectively. The clutch bar 14 is moved rightward in FIG. 1 together with the pinion 12 against the spring force and, therefore, the coupling between the pinion 12 and the coupling portion 2a of the spool shaft 2 is released, so that the clutch is changed to a disengaged state as shown in FIG. 4.

At this time, the link 22 is slid downward along the guide shaft 24 by the rotation of the clutch cam 17. After the link 22 has slid by a predetermined amount, the stepped portion 22b is caused to engage the guide shaft 24 by the link spring 26, thereby restraining temporarily the return of the link 22, the clutch cam 17 and the lever 18 to their original positions by the spring force of the lever spring 20. Although a counterclockwise rotational force is applied to the kick pawl 27 by the kick pawl spring 29 when the clutch is engaged, the rotation of the kick pawl 27 is limited because the guide shaft 24 functions as a stopper.

Thus, the movement of link 22 as described above releases the abutment of kick pawl 27 onto the guide shaft 24 so that the kick pawl 27 is rotated counterclockwise by the spring force to make the pawl tip 27b mesh with a trough portion 8a of the ratchet 3 as shown in FIG. 4. At the same time, the protrusion 27c of the kick pawl 27 abuts stopper 22f of the link 22 to limit the rotation of kick pawl 27. Consequently, kick pawl 27 cannot rotate further and the tip 27b is suitably meshed within the trough portion 8a of the ratchet 8.

Figure 6:
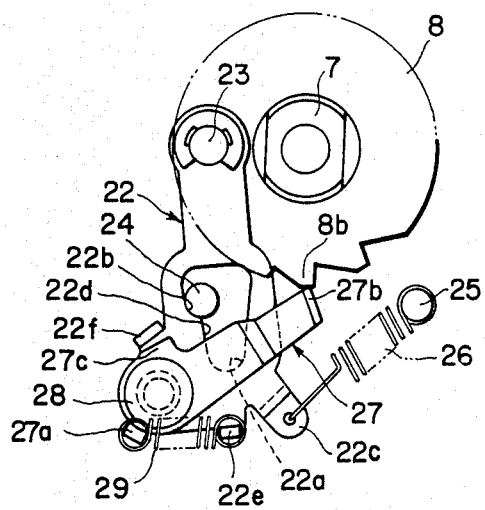
FIG. 6 depicts the state where the tip portion of the kick pawl contacts the tooth portion of the ratchet.
Figure 5:
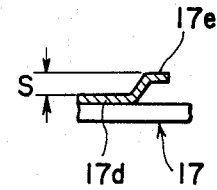
FIG. 5 is a longitudinal side view in cross-section showing the cam portion of the clutch cam.

Importantly, even in the case where the tip 27b of the kick pawl 27 does not coincide with any notch portion 8a of the ratchet 8 and does not properly mesh with the latter but rides on a tip of any tooth 8b as shown in FIG. 6, the clutch is changed over to the disengaged position because the stepped portion 22b of the link 22 is engaged with the guiding shaft 24. That is, faulty operation of the reel is prevented during the change-over of the clutch to the disengaged position.

Next, in the case where the clutch is changed from a disengaged state to the engaged condition, the handle 13 is rotated forward (in the fishing line reeling direction) to rotate the ratchet 8 in the direction of arrow C of FIG. 4 so that the tip 27b of the kick pawl 27 previously meshed within notch portion 8a is urged circumferentially by the tooth portion 8b. Kick pawl 27 is thus urged downwardly along the length thereof to slantingly and downwardly urge the link 22 against the spring force to rotate the link 22 clockwise. This motion casues the stepped portion 22b to disengage from guide shaft 24 and lever 18 to be rotated in the direction of the arrow A by lever spring 20, whereupon clutch cam 17 linked with the lever 18 rotates in the direction opposite to the direction of the arrow B in FIG. 2 to release the clutch bar 14. Clutch bar 14 is then urged to move toward the side plate 4a by the springs 16 to thereby cause the pinion 12 to move on the spool shaft 2 to engage the coupling portion 2a, so that the clutch is returned to the engaged state of FIGS. 1 and 2.

The clutch mechanism for a double-bearing reel according to the present invention is arranged in such a manner as described above and, therefore, the clutch is changed-over from the engaged to the disengaged position even in the case where the tip 27b of the kick pawl 27 is not meshed with a notch portion 8a of the ratchet but rests on the tip of a tooth 8b as in the case where the positions of the tip 27b and notch portion 8a do not coincide. The stepped portion 22b of the link 22 engages the guide shaft 24 so that the link 22 can be held in its descending position to thereby make it possible to change the clutch to the disengaged state to prevent faulty operation (the occurrence of a dead point) upon disengaging the clutch. In addition, the present invention results in a simplified structure using a small number of parts such as the link 22, the kick pawl 27, and the two springs 26 and 20, in comparison with conventional clutch mechanisms, which permit ready miniaturization and makes it possible to manufacture the device inexpensively.

The present invention has been disclosed in terms of a preferred embodiment. The invention is not limited thereto and the scope of the claims is determined by the appended claims and their equivalents.

What is claimed is:

1. A clutch mechanism for a fishing reel comprising:
frame means for supporting components of said reel in an operative arrangement;
a spool for storing and dispensing fishing line therefrom, said spool being rotatable held by said frame means;
means for driving said spool;
a spool shaft connected to and rotatable with said spool;
a pinion gear;
control means for selectively engaging said pinion gear to drive said spool, said control means including an actuating lever and cam means connected to said actuating lever, said cam means being rotatably mounted on said frame means for rotating with respect to said pinion gear to engage and disengage said pinion gear and said spool shaft;
first spring means urging said cam means to a position where said pinion gear is engaged with said spool shaft;
an elongated intermediate link having a first end pivotally connected to said cam means and a second end at an extremity of said link substantially opposite said first end, said link including an opening having a stepped portion and an elongated portion;
means for pivotally connecting said first end of said link to said cam means;
said frame means including a frame projection extending within said opening and disposed to limit movement of said link when said projection is engaged with said stepped portion of said opening, said stepped portion being engaged with said projection when said pinion gear is disengaged from said spool shaft;
second spring means connected between said link and said frame means for biasing said stepped portion of said link into engagement with said projection;
a kick pawl pivotally affixed to said second end of said link, said kick pawl having a tip portion spaced from said second end;
means for pivotally affixing said kick pawl to said second end of said link;
a circular ratchet member connected top said drive means and having a plurality of teeth disposed on an outer peripheral edge thereof;
third spring means connected between said kick pawl and said link for biasing said tip portion toward said ratchet member, said tip portion being disposed to lie between said teeth when said pinion gear is disengaged from said spool shaft; and means on said link for limiting the extent of movement of said tip portion toward said ratchet.

2. The clutch mechanism as defined in claim 1, wherein said ratchet member is rotated in a first direction by said driving means and wherein rotation of said ratchet member in said first direction, when said stepped portion is engaged with said projection, pivots said tip portion against the bias of said second spring means to urge said elongated portion of said link into engagement with said frame projection.

3. The clutch mechanism as defined in claim 1, wherein said cam means include a rotatable clutch cam having link means for connecting said clutch cam to said actuating lever, said clutch cam also having pivot means for pivotally connecting said clutch cam to said link.

4. The clutch mechanism as defined in claim 1, wherein said first spring means includes a first end adapted to be secured on said frame means and a second end attached to said actuating lever enabling said first spring means to apply a unidirectional force to said actuating lever.

5. The clutch mechanism as defined in claim 1, wherein said limiting means includes a stop member projecting from said link.

* * * * *